US012244204B2

United States Patent
Ryali et al.

(10) Patent No.: US 12,244,204 B2
(45) Date of Patent: Mar. 4, 2025

(54) METHODS AND APPARATUS FOR A FLUX-MODULATED PERMANENT MAGNET CLUTCH

(71) Applicant: General Electric Company, Schenectady, NY (US)

(72) Inventors: Lokaditya Ryali, Albany, NY (US); Bugra H Ertas, Niskayuna, NY (US); Adam Joseph Wangler, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/316,048

(22) Filed: May 11, 2023

(65) Prior Publication Data

US 2024/0380300 A1  Nov. 14, 2024

(51) Int. Cl.
| | |
|---|---|
| *H02K 49/10* | (2006.01) |
| *F04D 13/02* | (2006.01) |
| *F04D 15/00* | (2006.01) |
| *F04D 29/043* | (2006.01) |

(52) U.S. Cl.
CPC .......... *H02K 49/106* (2013.01); *F04D 13/024* (2013.01); *F04D 15/0088* (2013.01); *F04D 29/043* (2013.01)

(58) Field of Classification Search
CPC .. H02K 49/104; H02K 49/105; H02K 49/106; H02K 49/107; H02K 49/108
See application file for complete search history.

(56) References Cited

U.S. PATENT DOCUMENTS

| | | | |
|---|---|---|---|
| 4,844,707 A | 7/1989 | Kletschka | |
| 6,993,910 B2 | 2/2006 | Iwanami et al. | |
| 7,791,235 B2 | 9/2010 | Kern et al. | |
| 8,446,060 B1 | 5/2013 | Lugg | |
| 10,519,866 B2 | 12/2019 | Nayak et al. | |
| 10,815,900 B2 | 10/2020 | Madge | |
| 11,009,085 B2 | 5/2021 | Klemen et al. | |
| 11,333,078 B2 | 5/2022 | Nayak et al. | |
| 2016/0108923 A1* | 4/2016 | Drechsel | F04D 13/026 417/420 |

FOREIGN PATENT DOCUMENTS

| | | | |
|---|---|---|---|
| EP | 3255761 B1 * | 7/2020 | |
| WO | 2013091669 | 6/2013 | |

* cited by examiner

*Primary Examiner* — Tran N Nguyen
(74) *Attorney, Agent, or Firm* — HANLEY, FLIGHT & ZIMMERMAN, LLC

(57) ABSTRACT

Methods, apparatus, systems, and articles of manufacture are disclosed to a flux-modulated permanent magnet clutch. Disclosed is a magnetic clutch apparatus comprising a tension spring, an outer ring coupled to the tension spring, the outer ring including a first plurality of magnets, an inner ring coupled to an output shaft, the inner ring including a second plurality of magnets, the outer ring to magnetically engage with the inner ring, and an intermediate ring coupled to an input shaft, the intermediate ring disposed between the inner ring and the outer ring, the intermediate ring including a ferrous metal.

20 Claims, 11 Drawing Sheets

METHODS AND APPARATUS FOR A FLUX-MODULATED PERMANENT MAGNET CLUTCH

FIELD OF THE DISCLOSURE

This disclosure relates generally to fluid pumps and, more particularly, to methods and apparatus to reduce failures in low torque transmissions.

BACKGROUND

Clutches are used to couple an input shaft to an output shaft to provide a torque to the output shaft via the input shaft. Clutches typically include a plurality of gears and a locking mechanism to engage and disengage the clutch. Clutches can be used on many different applications such as aircraft engines, automobile transmissions, pump systems, etc.

Figure 1:
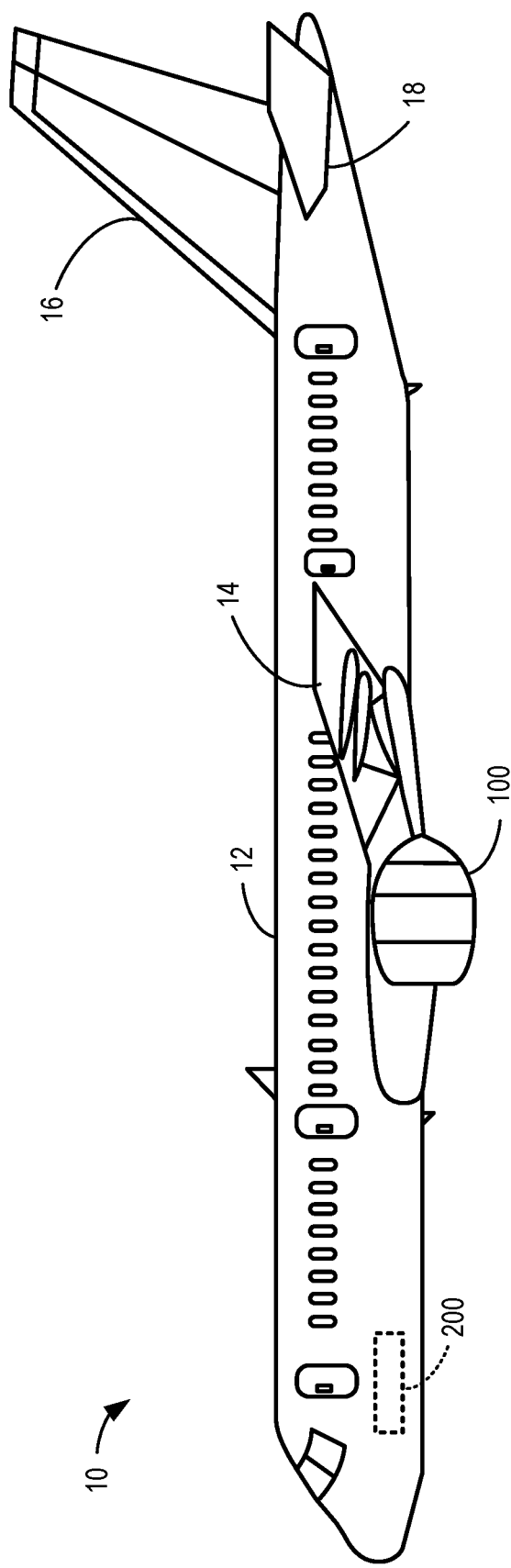
FIG. 1 is a side view of an example aircraft.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

The terms "forward" and "aft" refer to relative positions within a gas turbine engine, pump, or vehicle, and refer to the normal operational attitude of the gas turbine engine, pump, or vehicle. For example, with regard to a gas turbine engine, forward refers to a position closer to an engine inlet and aft refers to a position closer to an engine nozzle or exhaust. Further, with regard to a pump, forward refers to a position closer to a pump inlet and aft refers to a position closer to an end of the pump opposite the inlet.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

As used herein, "radially" is used to express a point or points along a radial vector originating at a central axis of a rotating body and pointing perpendicularly outward from the central axis. In some examples, two gears are said to be radially connected or coupled, meaning that the two gears are in physical contact with each other at point(s) along the circumferential outer edge surface of the gears via interlocking gear teeth. In some examples, two pulleys are said to be radially connected or coupled, meaning that the two pulleys are in physical contact with a drive belt at point(s) along the circumferential outer edge surface of the pulleys.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

Centrifugal fluid pumps move fluid through systems by converting rotational kinetic energy of an impeller to hydrodynamic energy of a flowing fluid. In other words, the angular velocity of the impeller is directly proportional to the flow rate of the flowing fluid exiting the pump. Typically, the impeller provides a change in rotational kinetic energy from an electric motor applying mechanical work to an impeller shaft coupled to the impeller and to the rotor of the electric motor. The rotor provides a change in mechanical work over a period of time (e.g., mechanical power) from a stator in the electric motor applying electromagnetic forces to the rotor in the form of torque. If the motor supplies a constant amount of electrical energy to the stator, then the rotor supplies a constant amount of mechanical energy to the impeller. In this case, the mechanical power supplied to the pump by the electric motor is equal to the quotient of the rotational kinetic energy and the amount of time the power is being supplied. In rotational systems, such as a centrifugal fluid pump, the mechanical power of the impeller is equal to the product of the torque and the angular velocity. When the rotor of the electric motor and the impeller shaft of the centrifugal fluid pump are coupled axially (e.g., by a magnetic coupling), then the torque and angular velocity of the rotor transfer to the impeller, via the coupled shafts, and have the same values.

In some examples of fluid pump systems, a motor shaft (e.g., a rotor) can be coupled to an impeller shaft via a magnetic coupling. Magnetic couplings transfer torque between two shafts without physical contact between the shafts. In some examples, the magnetic coupling can be in the form of an inner hub fastened to a first shaft (e.g., an impeller shaft) and an outer hub fastened to a second shaft (e.g., a rotor shaft). In the example outer hub, there are a series of magnets (e.g., bar magnets) positioned to surround the example inner hub with each magnet having an opposite charge of the preceding magnet in the series. In the inner hub, a similar series of magnets are positioned around an axis of rotation of the first shaft Because magnets of opposite charges are attracted to each other via magnetic fields, when the outer hub is positioned around the inner hub, a rotation of the outer hub causes the inner hub to rotate at the same rate. In other words, the example inner hub and the example outer hub are rotatably interlocked. This type of magnetic coupling can be referred to as a co-axial magnetic coupling. Because there is no physical contact between the inner hub and outer hub of the co-axial magnetic coupling, a containment barrier can be fastened to the housing surrounding the inner hub such that no fluid can pass from the inner hub side to the outer hub side.

Problems exist in such fluid pump systems where the presence of an electric motor increases the weight of the pump system, and the separation of the magnetic coupling and a clutch mechanism introduce more components that are prone to failure. Introducing more components that could fail and increasing a weight of the pump system increases testing required of the pump system to ensure that various standards are met and weight requirements are met (so that the aircraft or any other system utilizing a pump system operate properly).

Certain examples provide an integrated magnetic coupler and clutch design that reduces components and eliminates a need for a separate electric motor to drive the fluid pump system. As discussed further below, certain examples provide a fluid pump system that integrates a magnetic coupler and a clutch where the fluid pump system can be driven by the main engine shaft of the aircraft. Alternatively, the magnetic coupler and clutch disclosed below can be used in other applications using clutches such as automobile transmissions, pump systems, etc.

FIG. 1 is a side view of an example aircraft 10. As shown, the aircraft 10 includes a fuselage 12 and a pair of wings 14 (one is shown) extending outward from the fuselage 12. In the illustrated example of FIG. 1, a gas turbine engine 100 is supported on each wing 14 to propel the aircraft through the air during flight. Additionally, as shown, the aircraft 10 includes a vertical stabilizer 16 and a pair of horizontal stabilizers 18 (one is shown). However, in alternative examples, the aircraft 10 may be configured differently, such as with a different number and/or type of engines.

Furthermore, the aircraft 10 may include a thermal management system 200 for transferring heat between fluids supporting the operation of the aircraft 10. More specifically, the aircraft 10 may include one or more accessory systems configured to support the operation of the aircraft 10. For example, such accessory systems include a lubrication system that lubricates components of the engines 100, a cooling system that provides cooling air to components of the engines 100, an environmental control system that provides cooled air to the cabin of the aircraft 10, and/or the like. In such examples, the thermal management system 200 is configured to transfer heat to and/or from one or more fluids supporting the operation of the aircraft 10 (e.g., the oil of the lubrication system, the air of the cooling system and/or the environmental control system, and/or the like) from and/or to one or more other fluids supporting the operation of the aircraft 10 (e.g., the fuel supplied to the engines 100). However, in alternative examples, the thermal management system 200 may be configured to transfer heat between other fluids supporting the operation of the aircraft 10.

In addition to the thermal management system 200, the aircraft 10 is subjected to various forces during operation which include aerodynamic forces (e.g., lift, thrust, drag, gravity), vibration forces, shear forces, etc. As such, components within the aircraft 10 (e.g., such as the example thermal management system 200, the engine 100, etc.) need to withstand such forces without failure to ensure the aircraft 10 functions properly. Failure to the thermal management system 200 due to excessive forces can lead to failure of the engine 100 or failure to other systems on the aircraft 10. In some examples, the thermal management system 200 can prevent failures by proactively shutting down or disengaging components.

The configuration of the aircraft 10 described above and shown in FIG. 1 is provided only to place the present subject matter in an example field of use. Thus, the present subject matter may be readily adaptable to any manner of aircraft, any other suitable heat transfer application (e.g., other similar pump environment), and/or any other suitable low torque transmission application.

Figure 2:
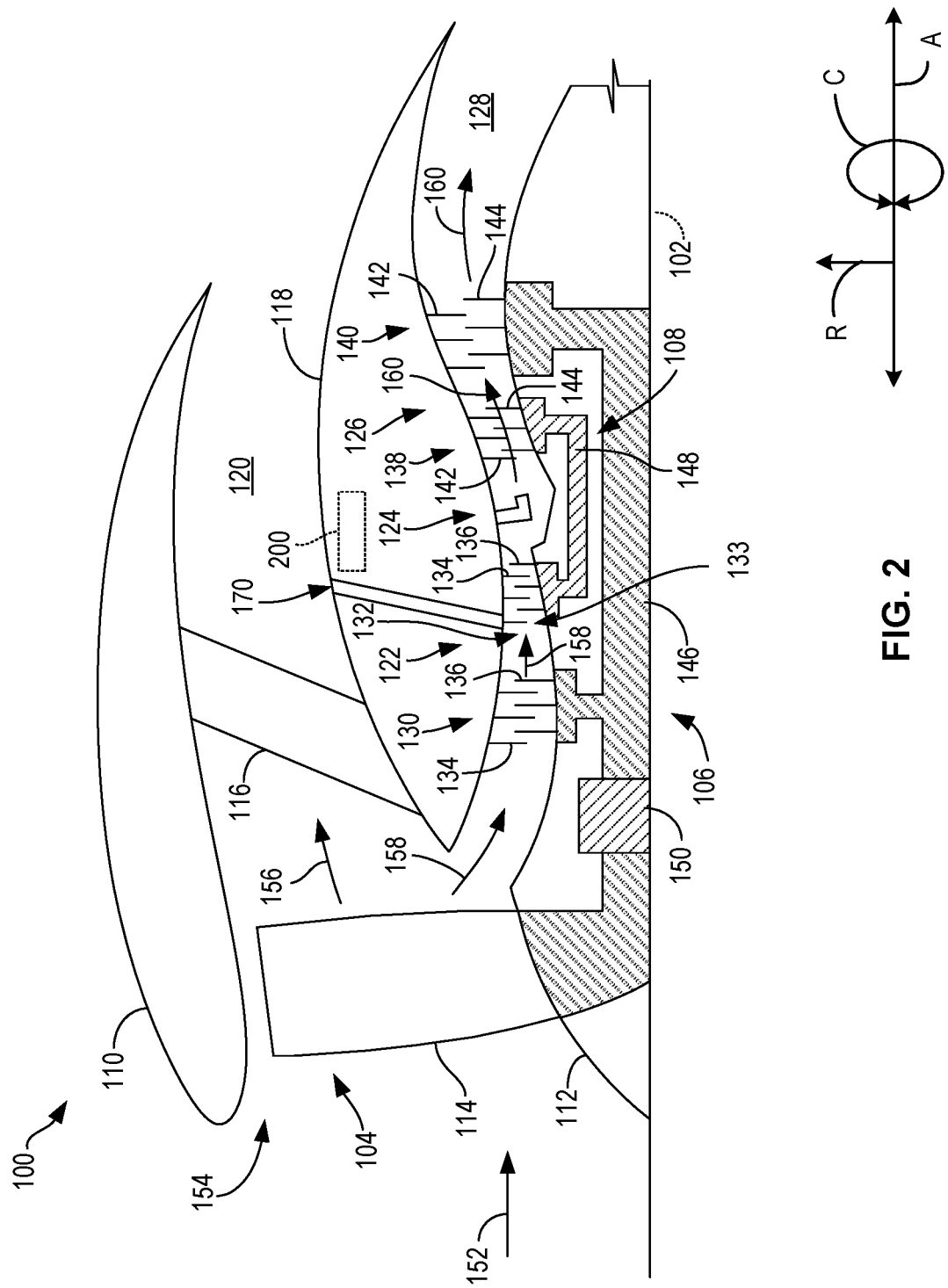
FIG. 2 is a schematic cross-sectional view of an example gas turbine engine of an aircraft.

FIG. 2 is a schematic cross-sectional view of an example gas turbine engine 100. In the illustrated example, the engine 100 is configured as a high-bypass turbofan engine. However, in alternative examples, the engine 100 may be configured as a propfan engine, a turbojet engine, a turboprop engine, a turboshaft gas turbine engine, or any other suitable type of gas turbine engine.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 may include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, thereby permitting the LP spool 106 to rotate the fan blades 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. In some examples, the thermal management system 200 disclosed above is encased in the outer casing 118. Encasing the thermal management system 200 in the outer casing 118 can allow the thermal management system 200 to be powered by the engine 100. In some examples, the compressor section 122 may include a low-pressure (LP) compressor 130 of the LP spool 106 and a high-pressure (HP) compressor 132 of the HP spool 108 positioned downstream from the LP compressor 130 along the axial centerline 102. Each compressor 130, 132 may, in turn, include one or more rows of stator vanes 134 interdigitated with one or more rows of compressor rotor blades 136. As such, the compressors 130, 132 define a compressed air flow path 133 extending therethrough. Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 may, in turn, include one or more rows of stator vanes 142 interdigitated with one or more rows of turbine rotor blades 144.

Additionally, the LP spool 106 includes the low-pressure (LP) shaft 146 and the HP spool 108 includes a high pressure (HP) shaft 148 positioned concentrically around the LP shaft 146. In such examples, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

In some examples, the engine 100 may generate thrust to propel an aircraft. More specifically, during operation, air (indicated by arrow 152) enters an inlet portion 154 of the engine 100. The fan 104 supplies a first portion (indicated by arrow 156) of the air 152 to the bypass airflow passage 120 and a second portion (indicated by arrow 158) of the air 152 to the compressor section 122. The second portion 158 of the air 152 first flows through the LP compressor 130 in which the compressor rotor blades 136 therein progressively compress the second portion 158 of the air 152. Next, the second portion 158 of the air 152 flows through the HP compressor 132 in which the compressor rotor blades 136 therein continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the turbine rotor blades 144 of the HP turbine 138 extract a first portion of kinetic and/or thermal energy therefrom. This energy extraction rotates the HP shaft 148, thereby driving the HP compressor 132. The combustion gases 160 then flow through the LP turbine 140 in which the turbine rotor blades 144 of the LP turbine 140 extract a second portion of kinetic and/or thermal energy therefrom. This energy extraction rotates the LP shaft 146, thereby driving the LP compressor 130 and the fan 104 via the gearbox 150. The combustion gases 160 then exit the engine 100 through the exhaust section 128.

As mentioned above, the aircraft 10 may include a thermal management system 200 for transferring heat between fluids supporting the operation of the aircraft 10. In this respect, the thermal management system 200 may be positioned within the engine 100. For example, as shown in FIG. 2, the thermal management system 200 is positioned within the outer casing 118 of the engine 100. However, in alternative examples, the thermal management system 200 may be positioned at any other suitable location within the engine 100.

Furthermore, in some examples, the engine 100 defines a third-stream flow path 170. In general, the third-stream flow path 170 extends from the compressed air flow path 133 defined by the compressor section 122 to the bypass airflow passage 120. In this respect, the third-stream flow path 170 allows a portion of the compressed air 158 from the compressor section 122 to bypass the combustion section 124. More specifically, in some examples, the third-stream flow path 170 may define a concentric or non-concentric passage relative to the compressed air flow path 158 downstream of one or more of the compressors 130, 132 or the fan 104. The third-stream flow path 170 may be configured to selectively remove a portion of compressed air 158 from the compressed air flow path 158 via one or more variable guide vanes, nozzles, or other actuatable flow control structures. In addition, as will be described below, in some examples, the thermal management system 200 may transfer heat to the air flowing through the third-stream flow path 170. However, a pressure and/or a flow rate of a fluid (e.g., a heat exchange fluid such as a supercritical fluid (e.g., supercritical carbon dioxide (sCO2), etc.)) within the thermal management system 200 limits a rate at which thermal energy is transferred between the air and the heat exchange fluid. Additionally, it is advantageous for the thermal management system 200 to produce the pressure and/or the flow rate with components (e.g., pump systems) that minimize and/or otherwise reduce a physical size of the thermal management system 200 and/or the components (e.g., pump systems) included therein. Moreover, the thermal management system 200 may help ensure that the heat exchange fluid is free of contaminants when thermal energy is to be transferred.

The example thermal management system 200, as described above, helps ensure proper operation of the aircraft 10. As such, the thermal management system 200 is operational to support the operation of the aircraft 10. The thermal management system 200 can include a pump system to move fluid throughout the thermal management system 200 to support heat transfer functionality. Pump systems can include clutch engagement and disengagement mechanisms to help ensure the pump system is operating appropriately. As disclosed above, pump systems can include proactive measures to help reduce or prevent component failure (e.g., proactive disengagement of a clutching mechanism, reducing moving components within the pump system, etc.). As disclosed herein, pump systems can include integrated magnetic coupling and clutching mechanisms for engaging/disengaging shafts providing a torque output and reducing components/weight in the pump system.

The configuration of the gas turbine engine 100 described above and shown in FIG. 2 is provided only to place the present subject matter in an example field of use. Thus, the present subject matter may be readily adaptable to any manner of gas turbine engine configuration, including other types of aviation-based gas turbine engines, marine-based gas turbine engines, and/or land-based/industrial gas turbine engines. Additionally, the present subject matter may be readily adaptable to other kinds of low torque transmission applications.

Figure 3:
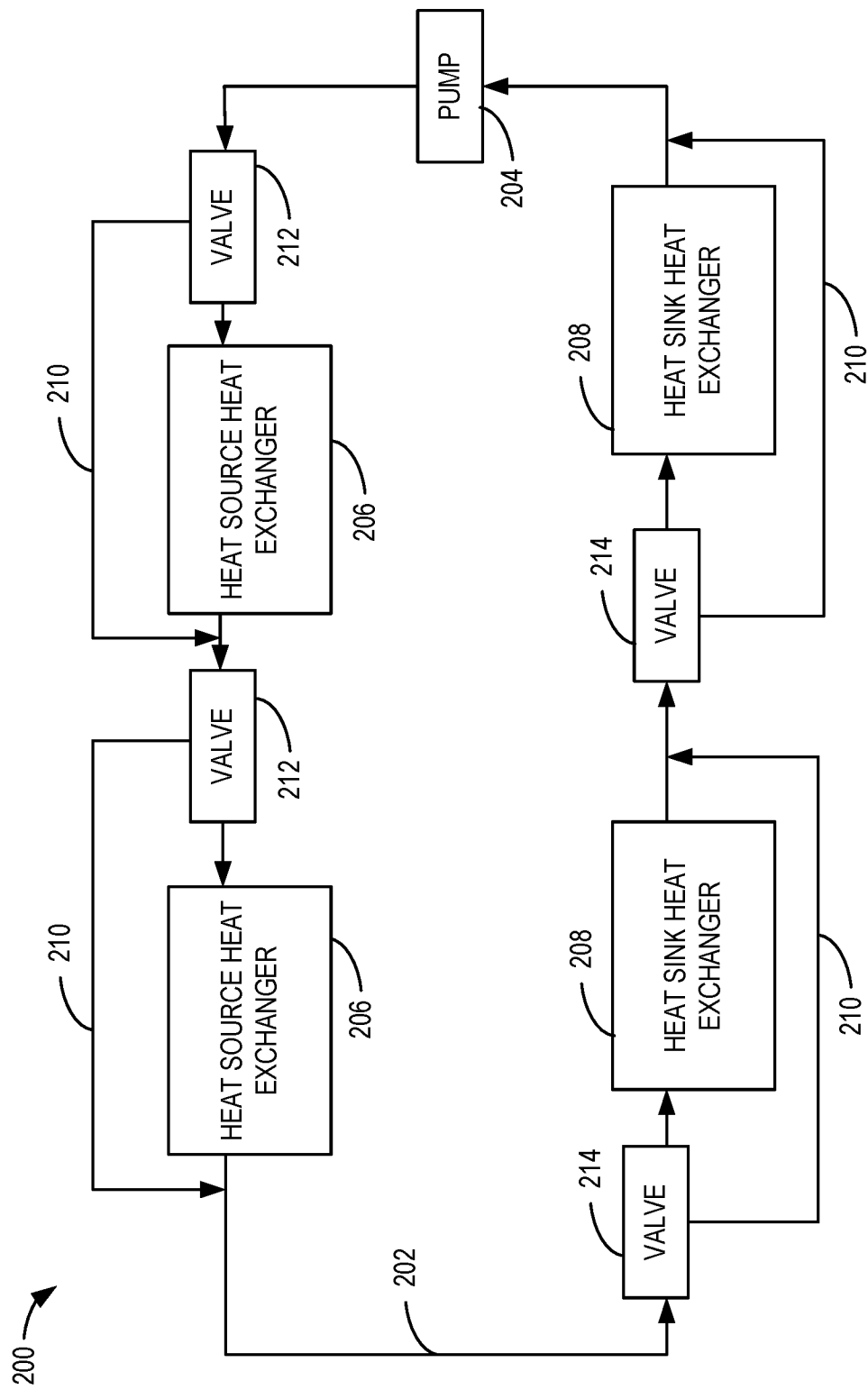
FIG. 3 is a schematic diagram of an example thermal management system for transferring heat between fluids.

FIG. 3 is a schematic view of an example implementation of the thermal management system 200 for transferring heat between fluids. In general, the thermal management system 200 will be discussed in the context of the aircraft 10 and the gas turbine engine 100 described above and shown in FIGS. 1 and 2. However, the disclosed thermal management system 200 may be implemented within other aircraft and/or any gas turbine engine configuration and/or any alternative configuration using a thermal management system, a pump system, or a clutch in general such as an automobile transmission.

As shown, the thermal management system 200 includes a thermal transfer bus 202. Specifically, in several examples, the thermal transfer bus 202 is configured as one or more fluid conduits through which a fluid (e.g., a heat exchange fluid) flows. As will be described below, the heat exchange fluid flows through various heat exchangers such that heat is added to and/or removed from the heat exchange fluid. In this respect, the heat exchange fluid may be any suitable fluid, such as supercritical carbon dioxide. Moreover, in such examples, the thermal management system 200 includes a pump 204 configured to pump the heat exchange fluid through the thermal transfer bus 202.

Additionally, the thermal management system 200 includes one or more heat source heat exchangers 206 arranged along the thermal transfer bus 202. More specifically, the heat source heat exchanger(s) 206 is fluidly coupled to the thermal transfer bus 202 such that the heat exchange fluid flows through the heat source heat exchanger(s) 206. In this respect, the heat source heat exchanger(s) 206 is configured to transfer heat from fluids supporting the operation of the aircraft 10 to the heat exchange fluid, thereby cooling the fluids supporting the operation of the aircraft 10. Thus, the heat source heat exchanger(s) 206 adds heat to the heat exchange fluid. Although FIG. 3 illustrates two heat source heat exchangers 206, the thermal management system 200 may include a single heat source heat exchanger 206 or three or more heat source heat exchangers 206.

The heat source heat exchanger(s) 206 may correspond to any suitable heat exchanger(s) that cool a fluid supporting the operation of the aircraft 10. In one example, at least one of the heat source heat exchangers 206 is a heat exchanger(s) of the lubrication system(s) of the engine(s) 100. In such an example, this heat exchanger(s) 206 transfers heat from the oil lubricating the engine(s) 100 to the heat transfer fluid. In another example, at least one of the heat source heat exchangers 206 is a heat exchanger(s) of the cooling system of the engine(s) 100. In such an example, this heat exchanger(s) 206 transfers heat from the cooling air bled from the compressor section(s) 122 (or a compressor discharge plenum) of the engine(s) 100 to the heat transfer fluid. However, in alternative examples, the heat source heat exchanger(s) 206 may correspond to any other suitable heat exchangers that cool a fluid supporting the operation of the aircraft 10.

Furthermore, the thermal management system 200 includes a plurality of heat sink heat exchangers 208 arranged along the thermal transfer bus 202. More specifically, the heat sink heat exchangers 208 are fluidly coupled to the thermal transfer bus 202 such that the heat exchange fluid flows through the heat sink heat exchangers 208. In this respect, the heat sink heat exchangers 208 are configured to transfer heat from the heat exchange fluid to other fluids supporting the operation of the aircraft 10, thereby heating the other fluids supporting the operation of the aircraft 10. Thus, the heat sink heat exchangers 208 remove heat from the heat exchange fluid. Although FIG. 3 illustrates two heat sink heat exchangers 208, the thermal management system 200 may include three or more heat sink heat exchangers 208.

The heat sink heat exchangers 208 may correspond to any suitable heat exchangers that heat a fluid supporting the operation of the aircraft 10. For example, at least one of the heat sink heat exchangers 208 is a heat exchanger(s) of the fuel system(s) of the engine(s) 100. In such an example, the fuel system heat exchanger(s) 208 transfers heat from the heat transfer fluid to the fuel supplied to the engine(s) 100. In another embodiment, at least one of the heat sink heat exchangers 208 is a heat exchanger(s) in contact with the air 156 flowing through the bypass airflow passage(s) 120 of the engine(s) 100. In such an example, this heat exchanger(s) 208 transfers heat from the heat exchange fluid to the air 156 flowing through the bypass airflow passage(s) 120.

In several examples, one or more of the heat sink heat exchangers 208 are configured to transfer heat to the air flowing through the third-stream flow path 170. In such examples, the heat exchanger(s) 208 is in contact with the air flow through the third-stream flow path 170. Thus, heat from the heat exchange fluid flowing through the thermal transfer bus 202 may be transferred to the air flow through the third-stream flow path 170. The use of the third-stream flow path 170 as a heat sink for the thermal management system 200 provides one or more technical advantages. For example, the third-stream flow path 170 provides greater cooling than other sources of bleed air because a larger volume of air flows through the third-stream flow path 170 than other bleed air flow paths. Moreover, the air flowing through third-stream flow path 170 is cooler than the air flowing through other bleed air flow paths and the compressor bleed air. Additionally, the air in the third-stream flow path 170 is pressurized, thereby allowing the heat exchanger(s) 208 to be smaller than heat exchangers relying on other heat sinks within the engine. Furthermore, in examples in which the engine 100 is unducted, using the third-stream flow path 170 as a heat sink does not increase drag on the engine 100 unlike the use of ambient air (e.g., a heat exchanger in contact with air flowing around the engine 100). However, in alternative examples, the heat sink heat exchangers 208 may correspond to any other suitable heat exchangers that heats a fluid supporting the operation of the aircraft 10.

Moreover, in several examples, the thermal management system 200 includes one or more bypass conduits 210. Specifically, as shown in the example of FIG. 3, each bypass conduit 210 is fluidly coupled to the thermal transfer bus 202 such that the bypass conduit 210 allows at least a portion of the heat exchange fluid to bypass one of the heat exchangers 206, 208. In some examples, the heat exchange fluid bypasses one or more of the heat exchangers 206, 208 to adjust the temperature of the heat exchange fluid within the thermal transfer bus 202. The flow of example heat exchange fluid through the bypass conduit(s) 210 is controlled to regulate the pressure of the heat exchange fluid within the thermal transfer bus 202. In the illustrated example of FIG. 3, each heat exchanger 206, 208 has a corresponding bypass conduit 210. However, in alternative examples, any number of heat exchangers 206, 208 may have a corresponding bypass conduit 210 so long as there is at least one bypass conduit 210.

Additionally, in several examples, the thermal management system 200 includes one or more heat source valves 212 and one or more heat sink valves 214. In general, each heat source valve 212 is configured to control the flow of the heat exchange fluid through a bypass conduit 210 that bypasses a heat source heat exchanger 206. Similarly, each heat sink valve 214 is configured to control the flow of the heat exchange fluid through a bypass conduit 210 that bypasses a heat sink heat exchanger 208. In this respect, each valve 212, 214 is fluidly coupled to the thermal transfer bus 202 and a corresponding bypass conduit 210. As such, each valve 212, 214 may be moved between fully and/or partially opened and/or closed positions to selectively occlude the flow of heat exchange through its corresponding bypass conduit 210.

The valves 212, 214 are controlled based on the pressure of the heat exchange fluid within the thermal transfer bus 202. More specifically, as indicated above, in certain instances, the pressure of the heat exchange fluid flowing through the thermal transfer bus 202 may fall outside of a desired pressure range. When the pressure of the heat exchange fluid is too high, the thermal management system 200 may incur accelerated wear. In this respect, when the pressure of the heat exchange fluid within the thermal transfer bus 202 exceeds a maximum or otherwise increased pressure value, one or more heat source valves 212 open. In such instances, at least a portion of the heat exchange fluid flows through the bypass conduits 210 instead of the heat source heat exchanger(s) 206. Thus, less heat is added to the heat exchange fluid by the heat source heat exchanger(s) 206, thereby reducing the temperature and, thus, the pressure of the fluid. In several embodiments, the maximum pressure value is between 3800 and 4000 pounds per square inch or less. In some embodiments, the maximum pressure value is between 2700 and 2900 pounds per square inch, such as 2800 pounds per square inch. In other embodiments, the maximum pressure value is between 1300 and 1500 pounds per square inch, such as 1400 pounds per square inch. Such maximum pressure values generally prevent the thermal management system 200 from incurring accelerated wear.

In some examples, the maximum pressure value is set prior to and/or during operation based on parameters (e.g., materials utilized, pump 204 design, aircraft 10 design, gas turbine engine 100 design, heat exchange fluid, etc.) associated with the thermal management system 200. The example maximum pressure value can be adjusted relative to the pressure capacities of the thermal transfer bus 202, the pump 204, the heat exchangers 206, 208, the bypass conduit(s) 210, and/or the valves 212, 214. Some examples of pump 204 architecture that influence example maximum pressure capacities are described in greater detail below.

Conversely, when the pressure of the heat exchange fluid is too low, the pump 204 may experience operability problems and increased wear. As such, when the pressure of the heat exchange fluid within the thermal transfer bus 202 falls below a minimum or otherwise reduced pressure value, one or more heat sink valves 214 open. In such instances, at least a portion of the heat exchange fluid flows through the bypass conduits 210 instead of the heat sink heat exchangers 208.

Thus, less heat is removed from the heat exchange fluid by the heat sink heat exchangers 208, thereby increasing the temperature and, thus, the pressure of the fluid. In several examples, the minimum pressure value is 1070 pounds per square inch or more. In some examples, the minimum pressure value is between 1150 and 1350 pounds per square inch, such as 1250 pounds per square inch. In other examples, the minimum pressure value is between 2400 and 2600 pounds per square inch, such as 2500 pounds per square inch. Such minimum pressure values are generally utilized when the heat exchange fluid is in a supercritical state (e.g., when the heat exchange fluid is carbon dioxide).

As such, the thermal management system 200 may be configured to operate such that the pressure of the heat transport fluid is maintained with a range extending between the minimum and maximum pressure values. In some examples, the range extends from 1070 to 4000 pounds per square inch. Specifically, in one example, the range extends from 1250 to 1400 pounds per square inch. In another example, range extends from 2500 to 2800 pounds per square inch.

Accordingly, the operation of the pump 204 and the valves 212, 214 allows the disclosed thermal management system 200 to maintain the pressure of the heat exchange fluid within the thermal transfer bus 202 within a specified range of values as the thermal load placed on the thermal management system 200 varies.

Furthermore, the example pump 204 drives the flow of the heat exchange fluid through the thermal management system 200. In some examples, the thermal management system 200 includes one pump 204 or a plurality of pumps 204 depending on the desired flow rate, delta pressure across the pump 204, and/or the kinetic energy loss of the heat exchange fluid in the thermal transfer bus 202. For example, the pump 204 may increase the output pressure head to accelerate the flow of the heat exchange fluid to a first flowrate. As the heat exchange fluid passes through the thermal transfer bus 202, the example kinetic energy of the heat exchange fluid dissipates due to friction, temperature variations, etc. Due to the kinetic energy losses, the heat exchange fluid decelerates to a second flow rate at some point upstream of the pump 204. If the example second flow rate is below a desired operating flow rate of the heat exchange fluid, then the pump 204 can either be of a different architecture that outputs a higher first flow rate, or one or more additional pumps 204 can be included in the thermal management system 200.

As disclosed above, the example pump 204 is important for proper functionality of the engine 100 and subsequently the aircraft 10. Failure to the pump 204 can result in increases in temperature of the fluid, insufficient pressure of the fluid, and/or insufficient fluid flow rate of the fluid moving throughout the thermal management system 200. Such failures can occur due to excessive forces within the pump 204, failure of components within the pump 204, insufficient reaction time to detect failures, etc. As discussed further below, examples disclosed herein provide an improved magnetic clutch and coupling mechanism for reducing moving parts, weight, and complexity within the pump 204.

Figure 4:
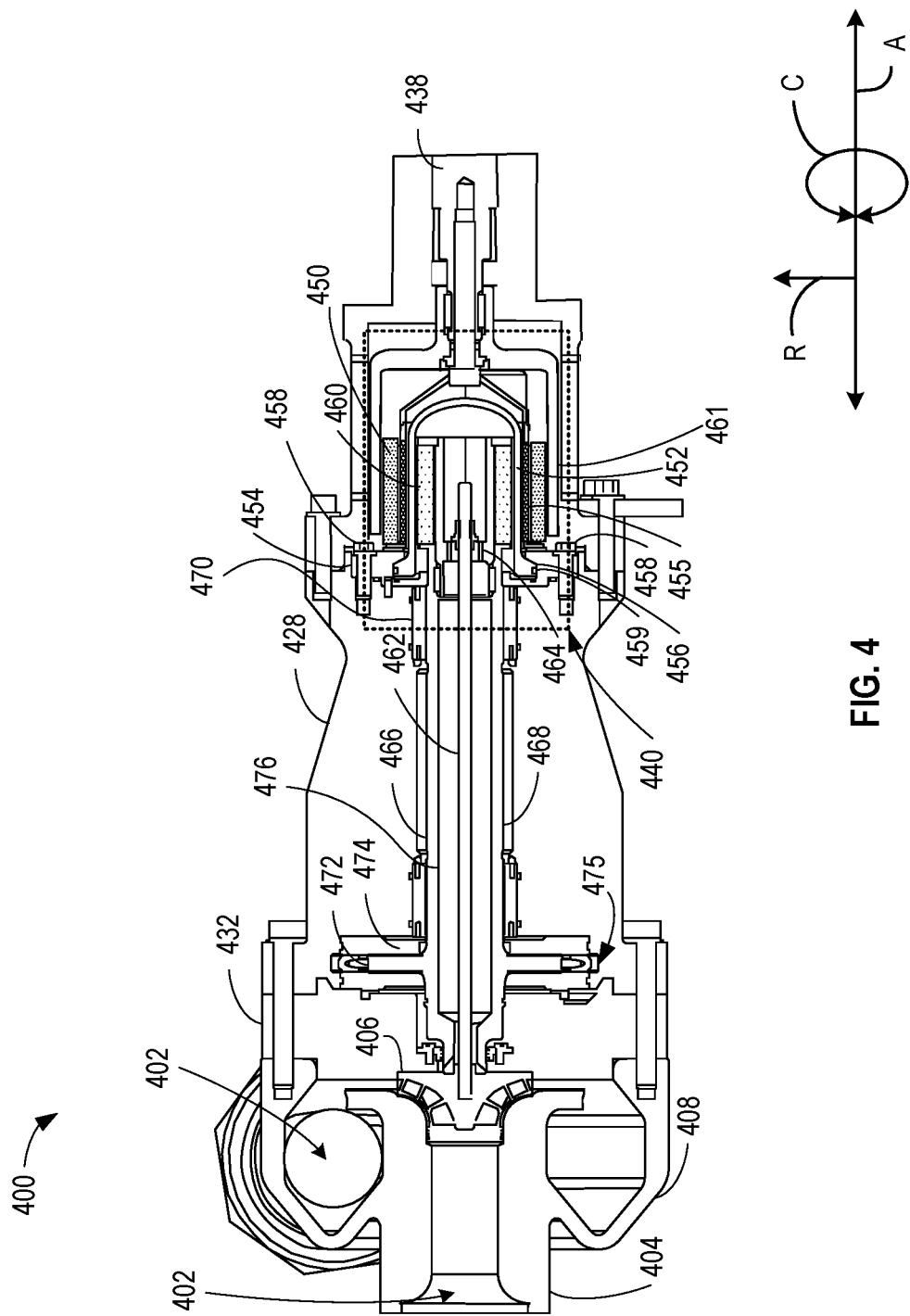
FIG. 4 illustrates an example thermal transport bus pump.

FIG. 4 illustrates an example thermal transport bus pump 400 (e.g., a magnetically driven pump, a canned motor pump, a fluid pump, a sCO2 pump, the pump 204 of FIG. 3, etc.). In the illustrated example of FIG. 4, the thermal transport bus pump 400 drives a fluid (e.g., heat exchange fluid such as sCO2, etc.) through one or more fluid conduits 402 connected to a flowline (e.g., the thermal transfer bus 202 of FIG. 3). Specifically, the fluid flows through an inlet pipe 404 and encounters an impeller 406 (e.g., a compressor wheel) that rotates to drive the fluid through a compressor collector 408 (e.g., a volute housing) fluidly coupled to the fluid conduit(s) 402. In turn, the fluid conduit(s) 402 can feed the fluid to one or more heat exchangers (e.g., the heat source heat exchanger 206 and/or the heat sink heat exchanger 208 of FIG. 3). Accordingly, the thermal transport bus pump 400 can pump the fluid to manage a thermal energy of working fluids associated with the aircraft 10 of FIG. 1, the gas turbine engine 100 of FIG. 2, and/or any other suitable system.

In some examples, a rotor shaft 438 (e.g., an input shaft) is coupled to the gearbox 150 (shown in FIG. 2, not shown in FIG. 4) and is driven by the rotation of the fan blades 114 of the engine 100. The impeller 406 is indirectly driven by the gearbox 150 through the rotor shaft 438. In other examples, the rotor shaft 438 can be coupled to a motor (not shown in this view) driving the rotation of the rotor shaft 438. The integration of the flux-modulated permanent magnet clutch in the example of FIG. 4 disclosed herein eliminates the need for a motor to drive the rotor shaft 438. As such, and disclosed further herein, the thermal transport bus pump 400 can operate via the main gearbox (e.g., the gearbox 150) within the engine 100.

As illustrated in FIG. 4, a flux-modulated permanent magnet clutch 440 (also referred to as a magnetic clutch) includes an outer ring of permanent magnets 450, a barrier can 452, a flux modulator ring 455, and an inner ring of permanent magnets 460. The flux modulator ring 455 is coupled to the rotor shaft 438 and the inner ring of permanent magnets 460 is coupled to an output shaft (e.g., an impeller shaft 466).

In the illustrated example of FIG. 4, an aft end of the outer ring of permanent magnets 450 (e.g., a female magnetic coupling) is positioned around a forward end of the rotor shaft 438. The flux modulator ring 455 is coupled to the rotor shaft 438 and rotates with the rotor shaft 438. As a result, the rotor shaft 438 drives a rotation of the flux modulator ring 455.

In the illustrated example of FIG. 4, the outer ring of permanent magnets 450 and the flux modulator ring 455 are positioned around the barrier can 452 (e.g., a shroud, hermetic boundary, etc.). To couple the barrier can 452 to a forward bearing housing 428, a barrier can retainer 454 (e.g., a retainer ring) is positioned around a flange 456 of the barrier can 452 and coupled to an aft end of the forward bearing housing 428 via bolts 458. Further, an O-ring 459 is positioned between the flange 456 of the barrier can 452 and the barrier can retainer 454. The barrier can 452 hermetically seals the aft end of the forward bearing housing 428 and, in turn, prevents the fluid from escaping. In some examples, the outer ring of permanent magnets 450 is coupled to the barrier can 452 and thus does not rotate with the rotation of the rotor shaft 438. In other examples, the outer ring of permanent magnets 450 is coupled to the forward bearing housing 428 or another component inside the thermal transport bus pump 400 that does not rotate. In some examples, the barrier can 452 is made of a non-magnetic material such as plastic.

In the illustrated example of FIG. 4, the barrier can 452 is positioned around the inner ring of permanent magnets 460 (e.g., a male magnetic coupling), which is magnetically couplable to the outer ring of permanent magnets 450. Specifically, opposite magnetic poles of the outer ring of permanent magnets 450 and the inner ring of permanent magnets 460 are aligned on opposite sides of the barrier can 452 and the flux modulator ring 455 are used to magnetically couple the outer ring of permanent magnets 450 to the inner ring of permanent magnets 460. As disclosed in further detail herein, the outer ring of permanent magnets 450 can move into and out of polar alignment with the inner ring of permanent magnets 460 (e.g., the magnetic forces of the magnetic poles of the outer ring of permanent magnets 450 and the inner ring of permanent magnets 460 are engaged and disengaged with an axial movement of the outer ring of permanent magnets 450).

During operation, when the barrier can 452 is made of a metallic material (e.g., aluminum, steel, etc.), the barrier can 452 produces thermal energy as a result of encountering the rotating magnetic fields produced by the outer ring of permanent magnets 450 and the inner ring of permanent magnets 460, and the fluid can absorb the heat from the barrier can 452 through a vent 461 to prevent the barrier can 452 from melting. In some examples, a fan drives the fluid circulation through the vent 461. In some other examples, the vent 461 is open to atmospheric air, or another fluid enclosure, which provides the fluid to absorb thermal energy from the barrier can 452.

In the illustrated example of FIG. 4, the inner ring of permanent magnets 460 is coupled to a tie rod 462 via a top hat 464. The tie rod 462 extends through the forward bearing housing 428 to couple to the impeller 406. Additionally, the inner ring of permanent magnets 460 is coupled to and/or extends from an impeller shaft 466 positioned around the tie rod 462. Similarly, the impeller shaft 466 extends through the forward bearing housing 428 to couple to the impeller 406. As a result, the tie rod 462 and the impeller shaft 466 cause the impeller 406 to rotate with the inner ring of permanent magnets 460 and pump the fluid.

In the illustrated example of FIG. 4, an axial portion 468 of the impeller shaft 466 is supported by journal bearing assemblies 470. Further, a radial portion 472 of the impeller shaft 466 is supported by a thrust bearing assembly 474. For example, the journal bearing assemblies 470 and/or the thrust bearing assembly 474 can include foil bearings. In some examples, the journal bearing assemblies 470 and the thrust bearing assembly 474 are coupled to the forward bearing housing 428 via bolts. Additionally or alternatively, the thrust bearing assembly 474 can be coupled to one of the journal bearing assemblies 470.

In the illustrated example of FIG. 4, the thermal transport bus pump 400 includes a secondary flow network having an inlet 475 in the forward bearing housing 428. Specifically, in the secondary flow network, the fluid enters the forward bearing housing 428 and flows between the radial portion 472 of the impeller shaft 466 and the thrust bearing assembly 474. Further, in the secondary flow network, a first portion of the fluid flows around the impeller shaft 466 and into the compressor collector 408. A second portion of the fluid in the secondary flow network flows around the impeller shaft 466 towards the barrier can 452. A separation between an aft end of the inner ring of permanent magnets 460 and the barrier can 452 enables the fluid to flow past the inner ring of permanent magnets 460 and back through the impeller shaft 466 towards the impeller 406. Further, the impeller shaft 466 includes a duct 476 that guides the fluid flowing therethrough between the backplate 432 and the impeller 406 causing the fluid to enter the compressor collector 408. Accordingly, as the gearbox 150 drives the rotation of the rotor shaft 438, the impeller 406 pumps the fluid through the fluid conduit(s) 402.

Figure 5:
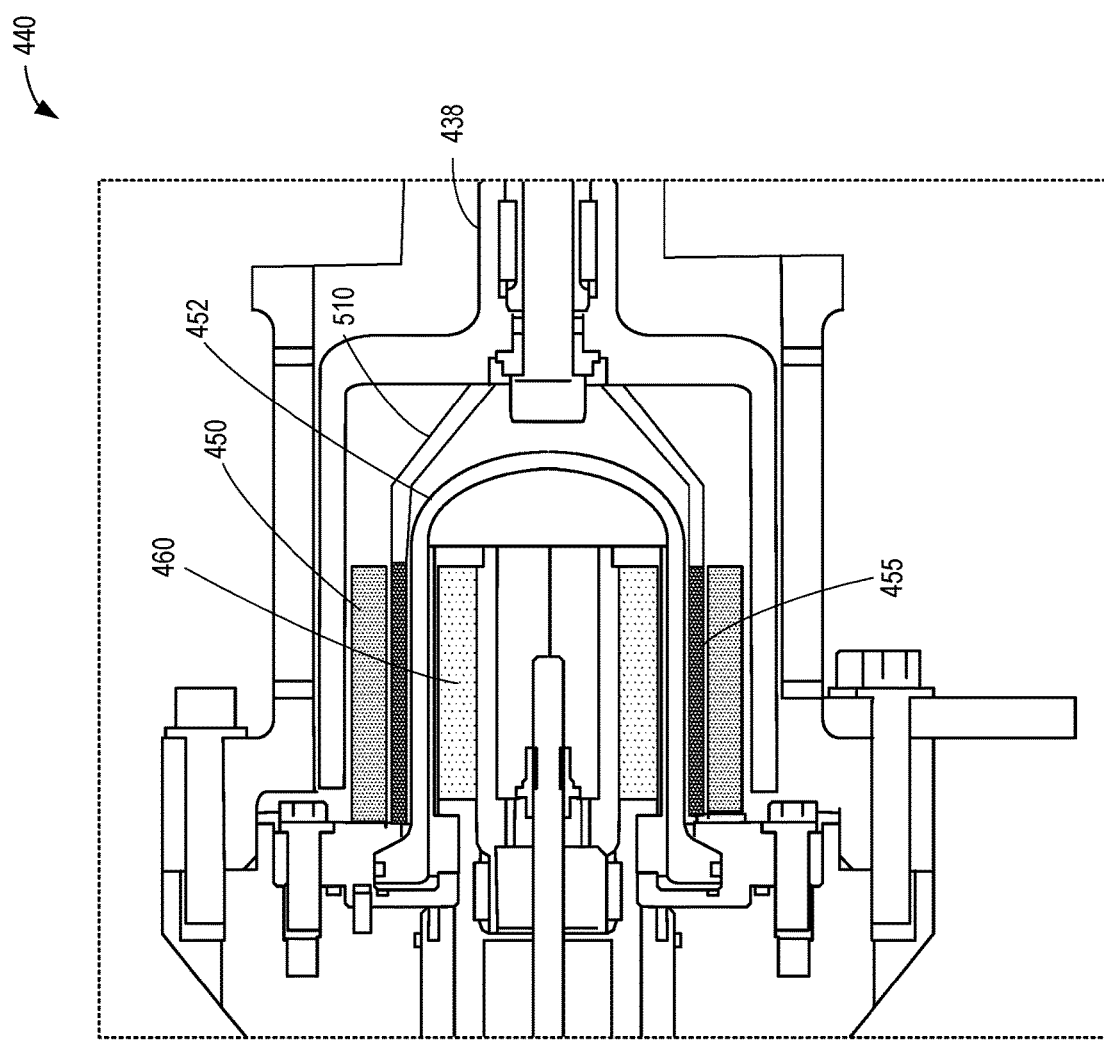
FIG. 5 is a close-up view of a flux-modulated permanent magnet clutch of FIG. 4.

FIG. 5 is a close-up view of the flux-modulated permanent magnet clutch 440 of FIG. 4. As illustrated in FIG. 5, the outer ring of permanent magnets 450 and the flux modulator ring 455 surrounds the barrier can 452 and the barrier can 452 surrounds the inner ring of permanent magnets 460. As disclosed in connection with FIG. 4, the outer ring of permanent magnets 450 does not rotate with the rotation of the rotor shaft 438 or the impeller shaft 466. In some examples, the outer ring of permanent magnets 450 is coupled to the barrier can 452 and axially moves to couple and decouple with the inner ring of permanent magnets 460.

The flux modulator ring 455 is disposed between the outer ring of permanent magnets 450 and the inner ring of permanent magnets 460 and modulates a flux between the magnetic poles of the first and inner ring of permanent magnets 450, 460. In examples disclosed herein, the inclusion of the flux modulator ring 455 allows the output torque applied to impeller shaft 466 to be amplified compared to the input torque provided by the rotor shaft 438 (e.g., a gear ratio of greater than 1 is achieved). In examples disclosed herein, the flux modulator ring 455 is composed of multiple ferrous metal pieces made from any ferromagnetic material such as alloy steel, cast iron, etc. In examples disclosed herein, the flux modulator ring 455 implements means for modulating a flux between the outer ring of permanent magnets 450 and the inner ring of permanent magnets 460.

As illustrated in FIG. 5, the flux modulator ring 455 is connected to the rotor shaft 438 via a flux modulator ring connector 510. In some examples, each metal piece of the flux modulator ring 455 includes a separate connector 510. In other examples, each metal piece of the flux modulator ring 455 is connected together and subsequently connected to the rotor shaft 438 via a single connector 510. As such, any method of connecting the flux modulator ring 455 to the rotor shaft 438 can be used herein with the goal of operably rotating the flux modulator ring 455 with the rotor shaft 438.

Figure 6:
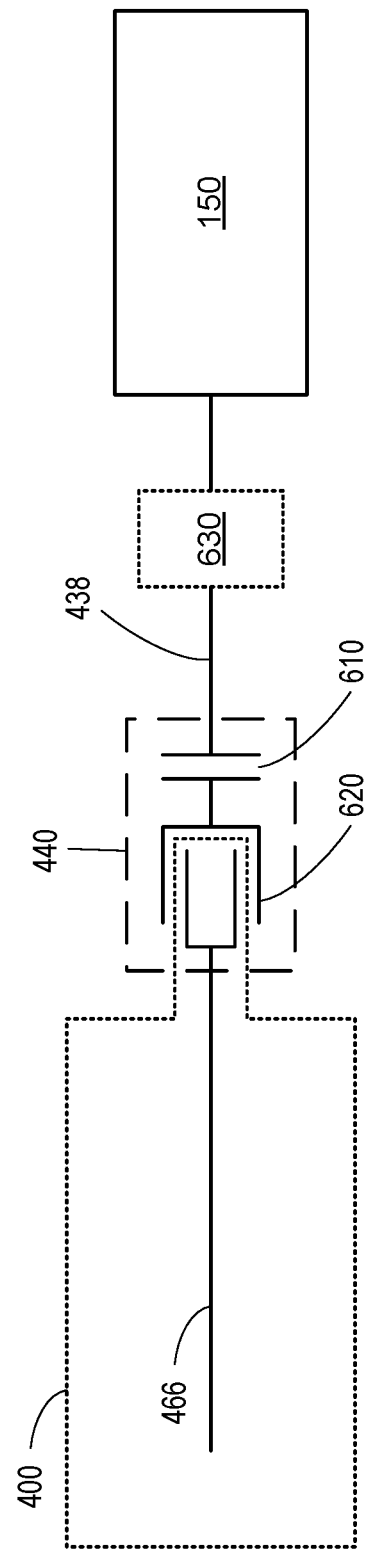
FIG. 6 is a schematic of the flux-modulated permanent magnet clutch of FIGS. 4 and/or 5.

FIG. 6 is a schematic of the flux-modulated permanent magnet clutch 440. As illustrated in FIG. 6, the flux-modulated permanent magnet clutch 440 includes a clutch 610 and a coupler 620. The clutch 610 and the coupler 620 are integrated with the inclusion of the outer ring of permanent magnets 450, the flux modulator ring 455, and the inner ring of permanent magnets 460.

As shown in FIG. 6, the rotor shaft 438 is driven by the gearbox 150. In some examples, the engine 100 includes an accessory gearbox 630 for driving the rotor shaft 438. In such an example, the accessory gearbox 630 is driven by the gearbox 150 (e.g., the accessory gearbox 630 reduces the torque provided by the fan blades 114 to operate the thermal transport bus pump 400).

Figure 7:
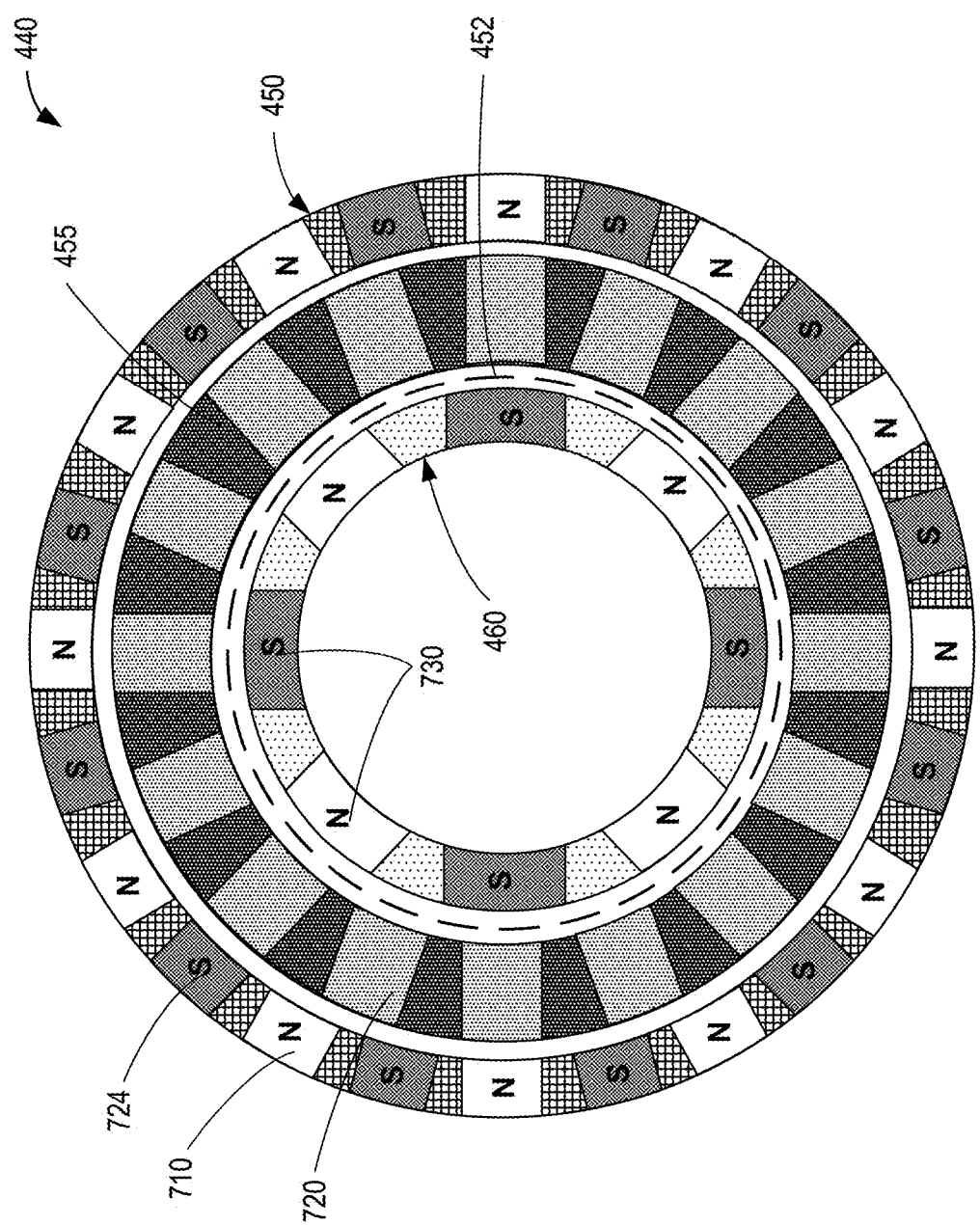
FIG. 7 is a schematic axial view of the flux-modulated permanent magnet clutch of FIGS. 4 and/or 5.

FIG. 7 is an axial view of the flux-modulated permanent magnet clutch 440 of FIGS. 4 and/or 5. As illustrated in FIG. 7, the flux-modulated permanent magnet clutch 440 includes the outer ring of permanent magnets 450 (also referred to as an outer ring), the flux modulator ring 455 (also referred to as an intermediate ring), and the inner ring of permanent magnets 460 (also referred to as an inner ring). In some examples, the barrier can 452 is disposed between the flux modulator ring 455 and the inner ring of permanent magnets 460.

As shown in FIG. 7, the outer ring of permanent magnets 450 includes multiple outer magnets 710 (two magnets of which are referenced in FIG. 7 with opposite poles). The outer ring of permanent magnets 450, as disclosed in FIG. 4, does not rotate and can be coupled to the barrier can 452. The outer ring of permanent magnets 450 moves axially to move into and out of polar alignment with the inner ring of permanent magnets 460.

The flux modulator ring 455 includes multiple ferromagnetic metal pieces 720 (one of which is referenced in FIG.

7). The flux modulator ring 455, as disclosed in reference to FIG. 4, is rotationally coupled to the rotor shaft 438.

The inner ring of permanent magnets 460 includes multiple inner magnets 730 (two magnets of which are referenced in FIG. 7 with opposite poles). The inner ring of permanent magnets 460, as disclosed in reference to FIG. 4, is rotationally coupled to the impeller shaft 466.

As shown in FIG. 7, the outer ring of permanent magnets 450 includes twenty-four permanent outer magnets 710 (e.g., twelve pairs of poles), the flux modulator ring 455 includes sixteen ferromagnetic metal pieces 720, and the inner ring of permanent magnets 460 includes eight permanent inner magnets 730 (e.g., four pairs of poles). The output gear ratio can be attained by utilizing Equation 1 below:

$$GearRatio_{out} = \frac{\text{Number of ferromagnetic pieces in the flux modulator ring}}{\text{Number of pole pairs on inner ring of permanent magnets}} \quad \text{(Equation 1)}$$

As shown in Equation 1, the output gear ratio is the quotient of the number of ferrous metal pieces on the flux modulator ring 455 and the number of magnetic pole pairs on the inner ring of permanent magnets 460. In the example of FIG. 7, the number of ferromagnetic pieces in the flux modulator ring 455 equals sixteen and the number of pole pairs on the inner ring of permanent magnets 460 equals four, which equates to a gear ratio of 4:1 (e.g., the output torque of the impeller shaft 466 is four times higher than the input torque provided by the rotor shaft 438). The number of ferromagnetic metal pieces on the flux modulator ring 455 and pole pairs on the inner ring of permanent magnets 460 can be interchangeably used herein to achieve a desired gear ratio different than the examples provided herein using the rule set forth in Equation 2:

$$\text{No. of pole pairs on inner ring} + \text{No. of pole pairs on outer ring} = \text{Number of ferromagnetic pieces on the flux modulator} \quad \text{(Equation 2)}$$

As shown in Equation 2, the number of ferromagnetic pieces that can be used in the flux modulator ring 455 to achieve a desired output gear ratio is equal to the number of pole pair on the inner ring of permanent magnets 450 plus the number of pole pairs on the outer ring of permanent magnets 460.

Figure 8:
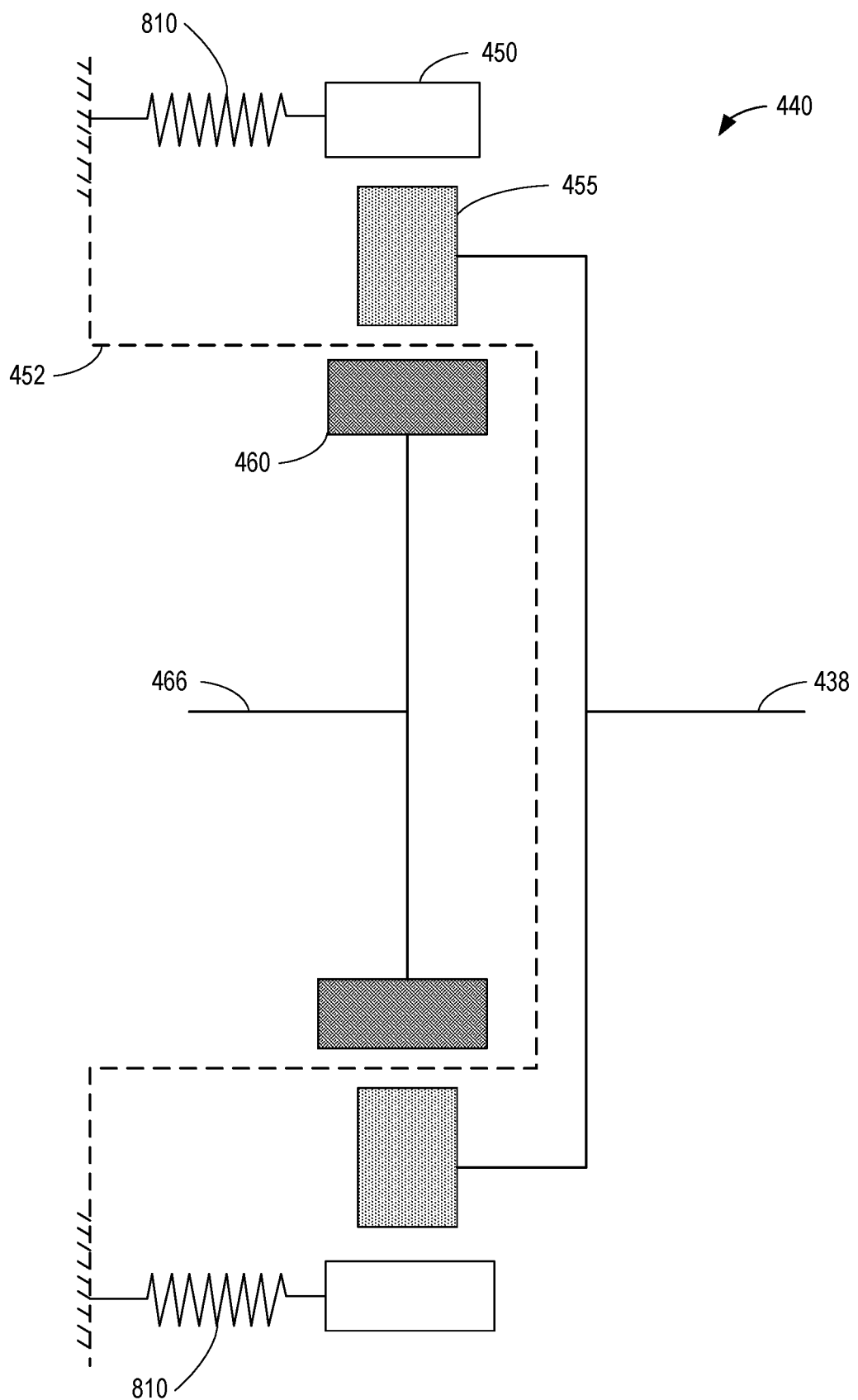
FIG. 8 is a schematic side view of the flux-modulated permanent magnet clutch of FIGS. 4 and/or 5 in an engaged position.

FIG. 8 is a schematic view of the flux-modulated permanent magnet clutch 440 in an engaged position. As shown in FIG. 8, the flux-modulated permanent magnet clutch 440 includes a tension spring 810 for moving the outer ring of permanent magnets 450 into and out of polar alignment with the inner ring of permanent magnets 460. In some examples, each permanent magnet in the outer ring of permanent magnets 450 includes a tension spring 810 to move each of the magnets into and out of polar alignment. In other examples, the outer ring of permanent magnets 450 includes a single tension spring 810 or a defined number of tension springs 810 (e.g., one tension spring per pair of poles, etc.) for moving the outer ring of permanent magnets 450 which moves the outer ring of permanent magnets 450 into and out of polar alignment with the inner ring of permanent magnets 460 or the corresponding inner ring of permanent magnets 460.

Figure 9B:
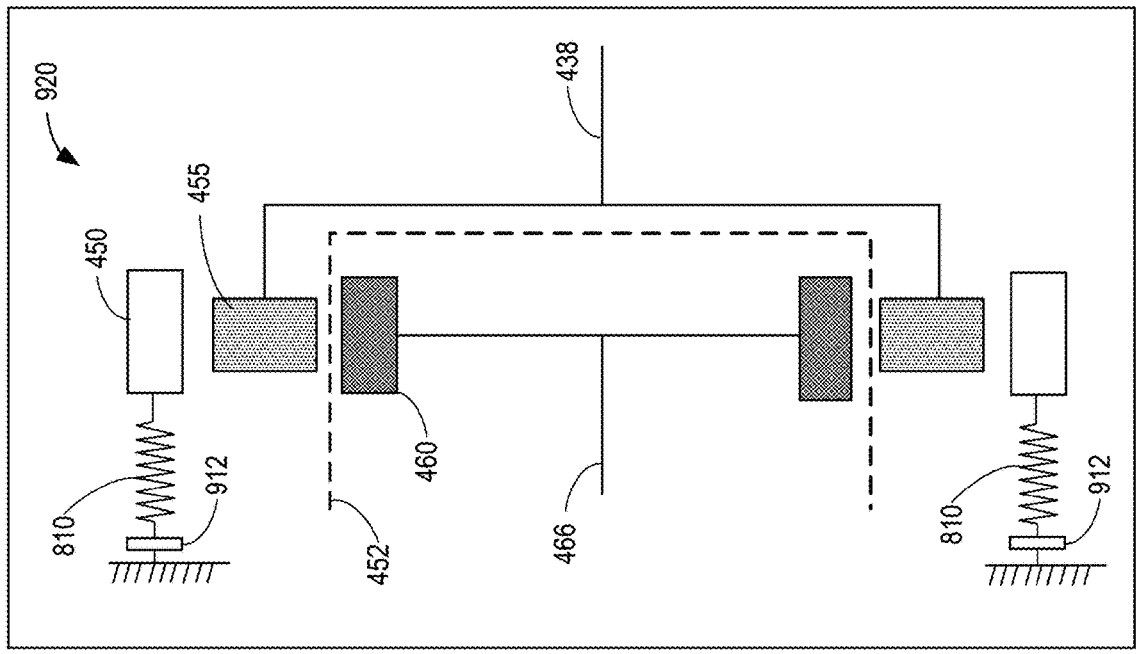
FIGS. 9A and 9B are schematic side views of the flux-modulated permanent magnet clutch of FIGS. 4 and/or 5 moving from a neutral disengaged position into an engaged position.
Figure 9A:
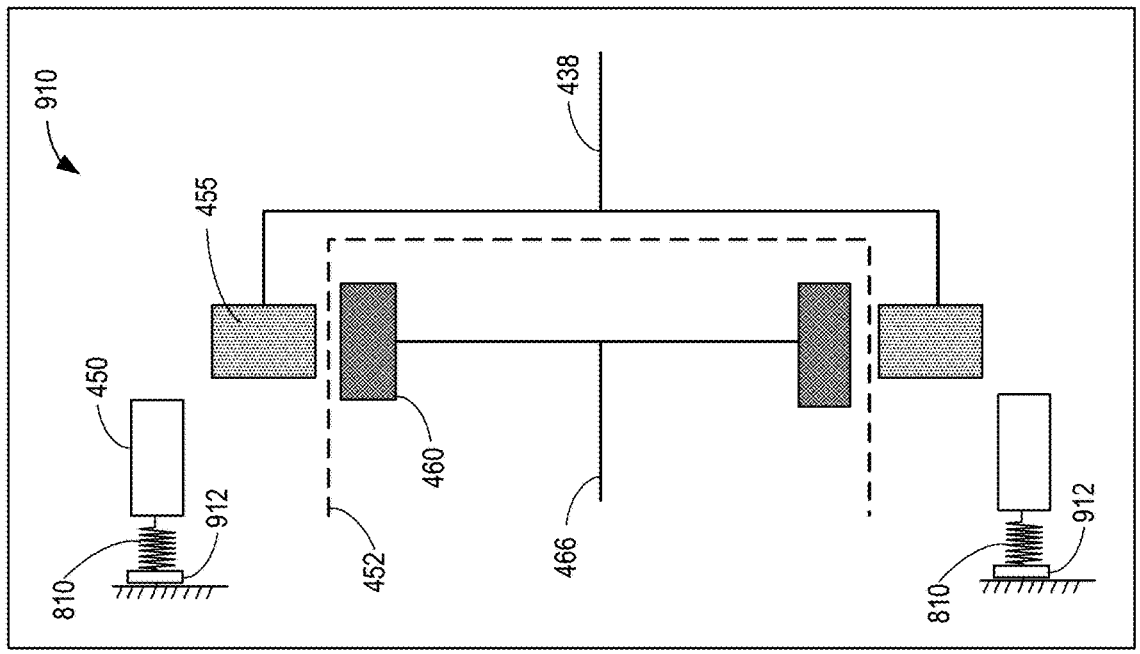

FIGS. 9A and 9B are schematic views of the flux-modulated permanent magnet clutch 440 of FIGS. 4 and/or 5 moving from a disengaged position 910 into an engaged position 920. As shown in FIG. 9A, the tension spring 810 is in a neutral position (e.g., no load applied to the tension spring 810). When the tension spring 810 is in the neutral position, the flux-modulated permanent magnet clutch 440 is disengaged (e.g., the first permanent magnet 450 is out of polar alignment with the second permanent magnet 460). When the flux-modulated permanent magnet clutch 440 is disengaged, the rotation of the rotor shaft 438 does not impart respective torque on the impeller shaft 466 since the magnetic coupling of the outer ring of permanent magnets 450 and the inner ring of permanent magnets 460 has not occurred. In some examples, the first permanent magnet 450 is coupled to the barrier can 452 via the tension spring 810.

As shown in FIG. 9B, a load can be applied to the spring 810 to move the outer ring of permanent magnets 450 into polar alignment with the inner ring of permanent magnets 460. Such a force can be imparted on the spring 810 via a clutch switch 912 (shown in FIGS. 9A and 9B). The clutch switch 912 can include any mechanism for imparting a force on a spring 810 such as using a solenoid switch, a pneumatic/hydraulic switch, etc. When the spring 810 is loaded, the outer ring of permanent magnets 450 moves into polar alignment with the inner ring of permanent magnets 460 and the torque imparted on the rotor shaft 438 is subsequently driving the impeller shaft 466, as disclosed herein. In some examples, the clutch switch 912 is controlled via a processor executing machine readable instructions to engage or disengage the flux-modulated permanent magnet clutch 440. In some examples, the clutch switch 912 and/or the spring 810 implement means for coupling the outer ring of permanent magnets 450 to the inner ring of permanent magnets 460.

In some examples, the magnets on the outer ring of permanent magnets 450 and the inner ring of permanent magnets 460 have a length of 1.5 inches. In such an example, the outer ring of permanent magnets 450 is moved 1.5 inches to move into and out of polar alignment with the inner ring of permanent magnets 460. More generally, the magnets can be of a length determined by the pump in which the magnets are positioned (e.g., larger pumps may require larger magnets to ensure a secure coupling). The outer ring of permanent magnets 450 is moved the length of the magnets to engage/disengage the flux-modulated permanent magnet clutch 440. The example movement of the magnets to engage/disengage the flux-modulated permanent magnet clutch 440 should be understood to represent an example engagement and disengagement and can use alternative methods for engaging/disengaging my moving the outer ring of permanent magnets 450.

Figure 10:
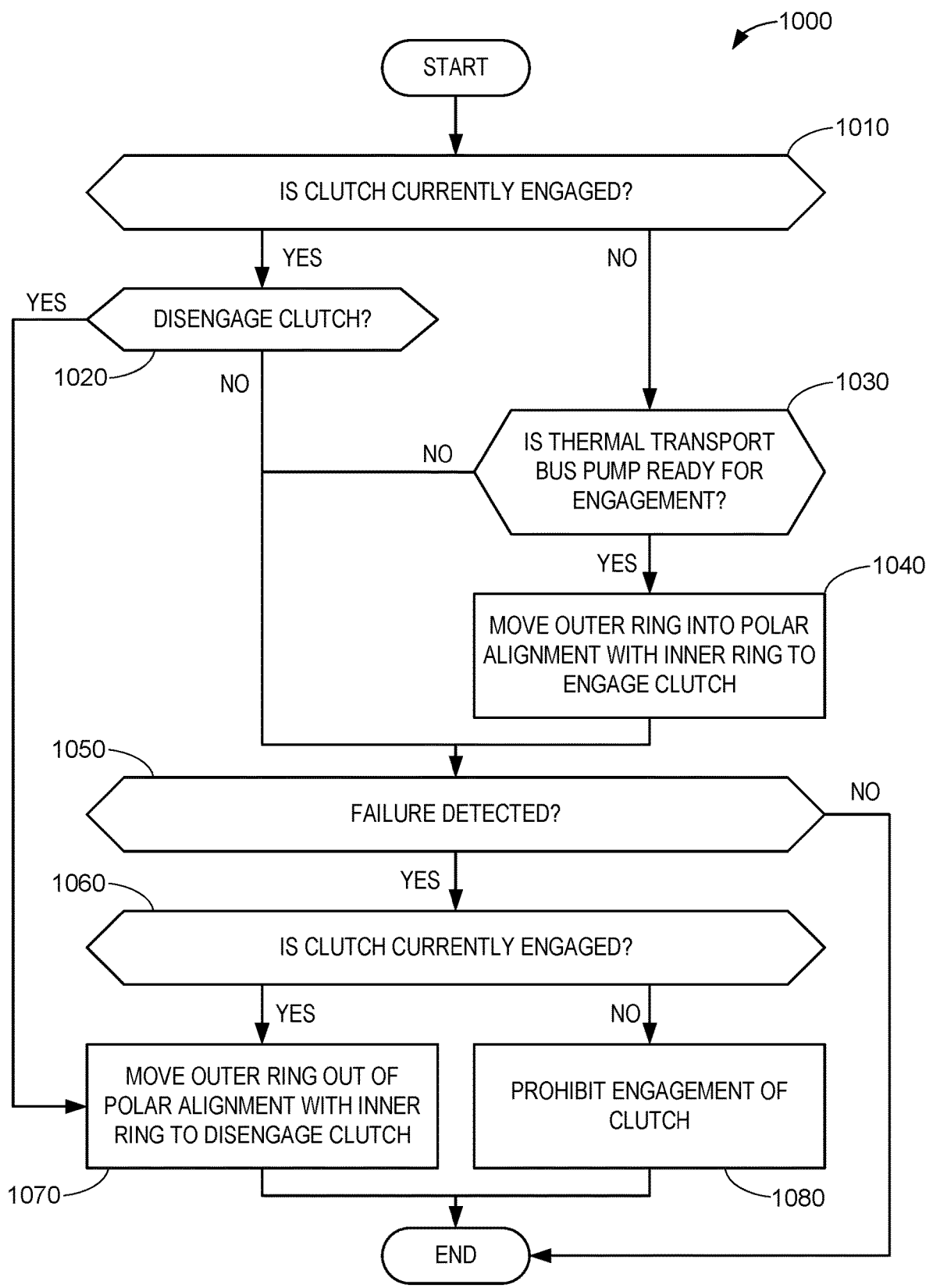
FIG. 10 is a flowchart representative of example machine readable instructions and/or example operations that may be executed by example processor circuitry to control the example thermal transport bus pump of FIG. 4.

A flowchart representative of example machine readable instructions, which may be executed to configure processor circuitry to control engagement of the example thermal transport bus pump 400 of FIG. 4, is shown in FIG. 10. The machine readable instructions may be one or more executable programs or portion(s) of an executable program for execution by processor circuitry, such as the processor circuitry 1112 shown in the example processor platform 1100 discussed below in connection with FIG. 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 10, many other methods of controlling engagement of the example thermal transport bus pump 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

FIG. 10 is a flowchart representative of example machine readable instructions and/or example operations 1000 that may be executed and/or instantiated by processor circuitry to control engagement of the example thermal transport bus pump 400. The machine readable instructions and/or the example clutch switch control process 1000 of FIG. 10 begin at block 1010, at which a determination is made as to whether the clutch (e.g., the flux-modulated permanent magnet clutch 440) is engaged. The example clutch switch control process 1000 can begin whether the flux-modulated permanent magnet clutch 440 is engaged or disengaged.

When it is determined that the flux-modulated permanent magnet clutch 440 is currently engaged (e.g., block 1010 returns a result of YES), a determination is made as to whether to disengage the flux-modulated permanent magnet clutch 440. (Block 1020). In some examples, the thermal transport bus pump 400 of FIG. 4 is disengaged due to a lack of sCO2 fluid in the pump, insufficient rotation of the impeller shaft 466 and/or the rotor shaft 438, the engine 100 is shut down, the sCO2 has not reached the correct phase, and/or any other normal (e.g., non-failure) disengagement of the flux-modulated permanent magnet clutch 440.

When it is determined that the flux-modulated permanent magnet clutch 440 is not currently engaged (e.g., block 1010 returns a result of NO), a determination is made as to whether the thermal transport bus pump 400 is ready for engagement of the flux-modulated permanent magnet clutch 440. (Block 1030). In some examples, the sCO2 within the thermal transport bus pump 400 needs to be at a certain phase before engagement of the flux-modulated permanent magnet clutch 440 is allowed. In some such examples, sensors within the thermal transport bus pump 400 (e.g., temperature sensors, pressure sensors, etc.) ensure that no liquid remains of the sCO2 (e.g., the sCO2 is fully transformed from a liquid phase to a gaseous phase) through monitoring the sensors in the thermal transport bus pump 400. In some examples, the engagement of the flux-modulated permanent magnet clutch 440 is tied to the speed of the fan blades 114 of the engine 100. In such an example, the flux-modulated permanent magnet clutch 440 might be disengaged until the fan blades 114 reach a certain speed.

When it is determined that the thermal transport bus pump 400 is ready for engagement (e.g., block 1030 returns a result of YES), then the outer ring of permanent magnets 450 is moved into polar alignment with the inner ring of permanent magnets 460 to engage the flux-modulated permanent magnet clutch 440. (Block 1040). In the examples disclosed herein, the engagement of the flux-modulated permanent magnet clutch 440 is achieved by exerting a load on the tension spring 810 to move the outer ring of permanent magnets 450.

When it is determined that the flux-modulated permanent magnet clutch 440 is not to be disengaged (e.g., block 1020 returns a result of NO), when the thermal transport bus pump is not ready for engagement (e.g., block 1030 returns a result of NO), or when the flux-modulated permanent magnet clutch 440 is engaged from block 1040, a determination is made as to whether a failure of the thermal transport bus pump 400 has been detected. (Block 1050). In some examples, the thermal transport bus pump 400 includes bearing and other components for proper operation of the thermal transport bus pump 400. In some examples, failures or potential failures of those components are detected via sensors distributed throughout the thermal transport bus pump 400.

When a failure to the components inside the thermal transport bus pump 400 has been detected (e.g., block 1050 returns a result of YES), a second determination is made regarding the current status of the flux-modulated permanent magnet clutch 440. (Block 1060). In some examples, the status of the engagement or disengagement of the flux-modulated permanent magnet clutch 440 is a continuous check (e.g., every cycle, every 100 milliseconds, every 1 second, etc.). In other examples, the status of the engagement or disengagement of the flux-modulated permanent magnet clutch 440 is periodic and is only checked when a status change is desired (e.g., engaged to disengaged, disengaged to engaged, failure detected, etc.).

When it is determined that a failure is present and the flux-modulated permanent magnet clutch 440 is currently engaged (e.g., block 1060 returns a result of YES) or when it is determined that the clutch is to be disengaged (e.g., block 1020 returns a result of YES), the outer ring of permanent magnets 450 is moved out of polar alignment with the inner ring of permanent magnets 460 to disengage the flux-modulated permanent magnet clutch 440. (Block 1070). In the examples disclosed herein, the disengagement of the flux-modulated permanent magnet clutch 440 is achieved by removing a load on the tension spring 810 so the tension spring 810 relaxes to a neutral position.

When it is determined that a failure is present and the flux-modulated permanent magnet clutch 440 is currently disengaged (e.g., block 1060 returns a result of NO), the engagement of the flux-modulated permanent magnet clutch 440 is prohibited. (Block 1080). In some examples, the engagement is prohibited by prohibiting the clutch switch 912 from exerting a force on the spring 810 to engage the flux-modulated permanent magnet clutch 440. In some examples, the prohibition persists until the failure has been resolved (e.g., the component has been replaced, the failure conditions are no longer present, etc.).

When no failure has been detected (e.g., block 1050 returns a result of NO), when the flux-modulated permanent magnet clutch 440 is disengaged via block 1070, or when the engagement of the flux-modulated permanent magnet clutch 440 is prohibited via block 1080, the example clutch switch control process 1000 ends. In some examples, the example clutch switch control process 1000 is executed continuously (e.g., every cycle, every 100 milliseconds, every 1 second, etc.) to check the status of the flux-modulated permanent magnet clutch 440.

Figure 11:
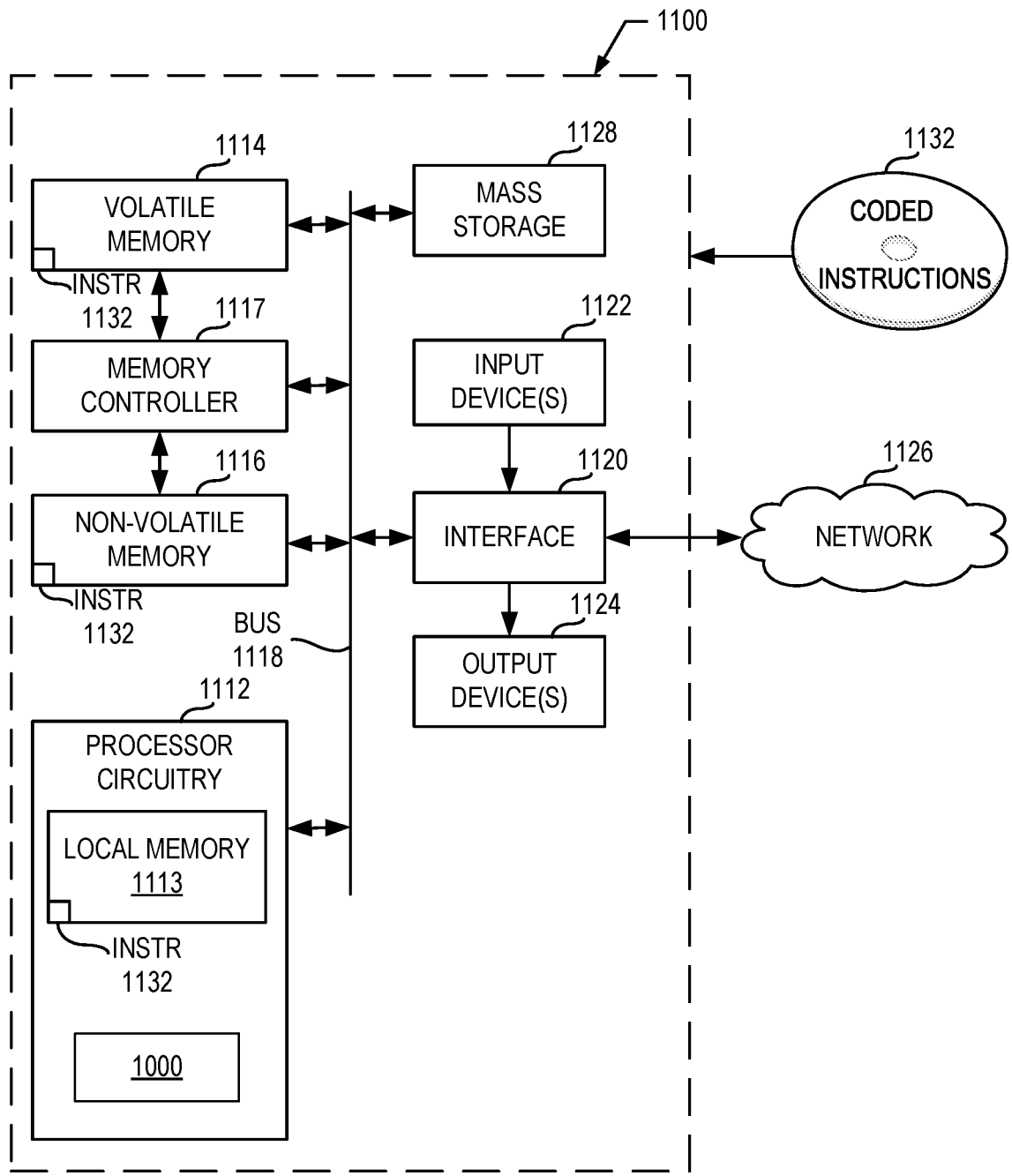
FIG. 11 is a block diagram of an example processing platform including processor circuitry structured to execute the example machine readable instructions and/or the example operations of FIG. 10.

FIG. 11 is a block diagram of an example processor platform 1100 structured to execute and/or instantiate the machine readable instructions and/or the operations of FIG. 10 to control engagement of the example thermal transport bus pump 400 of FIG. 4. The processor platform 1100 can be, for example, an autopilot system or any other kind of control system, a mobile device, a personal computer, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example clutch switch control process 1000.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, a sensor, a camera (still or video), a keyboard, a button, and/or any other similar device.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.). The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1132, which may be implemented by the machine readable instructions of FIG. 10, may be stored in the mass storage device 1128, in the volatile memory 1114, in the non-volatile memory 1116, and/or on a removable non-transitory computer readable storage medium such as a CD or DVD.

In some examples, the processor platform 1100 implements means for controlling the flux-modulated permanent magnet clutch 440 by implementing the example clutch switch control process 1000 of FIG. 10.

From the foregoing, it will be appreciated that example systems, methods, apparatus, and articles of manufacture have been disclosed for a flux-modulated permanent magnet clutch. Examples disclosed herein provide a flux-modulated permanent magnet clutch that eliminates the need for a dedicated motor and a separate clutch mechanism in a thermal transport bus pump for engaging an input shaft with an output shaft. Examples disclosed herein combine a magnetic clutch and a magnetic coupler to reduce moving parts and additional components in a low torque transmission prone to failure.

Example methods, apparatus, systems, and articles of manufacture to a flux-modulated permanent magnet clutch are disclosed herein. Further examples and combinations thereof include the following:

Example 1 includes a magnetic clutch apparatus comprising a tension spring, an outer ring coupled to the tension spring, the outer ring including a first plurality of magnets, an inner ring coupled to an output shaft, the inner ring including a second plurality of magnets, the outer ring to magnetically engage with the inner ring, and an intermediate ring coupled to an input shaft, the intermediate ring disposed between the inner ring and the outer ring, the intermediate ring including a ferrous metal.

Example 2 includes the magnetic clutch apparatus of any preceding clause, further including a hermetic boundary separating the inner ring from the intermediate ring.

Example 3 includes the magnetic clutch apparatus of any preceding clause, wherein the hermetic boundary is made of a non-magnetic material.

Example 4 includes the magnetic clutch apparatus of any preceding clause, wherein the outer ring is coupled to the hermetic boundary via the tension spring.

Example 5 includes the magnetic clutch apparatus of any preceding clause, wherein the intermediate ring includes a plurality of ferrous metal pieces, a number of ferrous metal pieces and a number of magnets on the inner ring based upon a desired gear ratio.

Example 6 includes the magnetic clutch apparatus of any preceding clause, wherein the desired gear ratio is determined by dividing the number of ferrous metal pieces on the intermediate ring by a number of magnetic pole pairs on the inner ring.

Example 7 includes the magnetic clutch apparatus of any preceding clause, wherein the number of ferrous metal pieces on the intermediate ring is equal to a sum of the number of magnetic pole pairs on the inner ring and a number of pole pairs on the outer ring.

Example 8 includes the magnetic clutch apparatus of any preceding clause, further including a clutch switch, the clutch switch to move the outer ring via the tension spring to engage and disengage the magnetic clutch apparatus by moving the inner ring and the outer ring into and out of polar alignment.

Example 9 includes the magnetic clutch apparatus of any preceding clause, wherein the inner ring rotates with the output shaft and the intermediate ring rotates with the input shaft.

Example 10 includes the magnetic clutch apparatus of any preceding clause, wherein the outer ring remains stationary.

Example 11 includes a pump system comprising a rotor shaft coupled to a gearbox, an impeller shaft, the impeller shaft coupled to an impeller, and a magnetic clutch to engage the rotor shaft and the impeller shaft, the magnetic clutch including a tension spring, an outer magnetized ring coupled to the tension spring, the outer magnetized ring including a first plurality of magnets, an inner magnetized ring coupled to the impeller shaft, the inner magnetized ring including a second plurality of magnets, the outer magnetized ring to magnetically engage with the inner magnetized ring, and an intermediate ring coupled to the rotor shaft, the intermediate ring disposed between the inner magnetized ring and the outer magnetized ring, the intermediate ring including a ferrous metal, wherein a first movement of the outer magnetized ring into a polar alignment with the inner magnetized ring engages the magnetic clutch and a second movement of the outer magnetized ring out of polar alignment with the inner magnetized ring disengages the magnetic clutch.

Example 12 includes the pump system of any preceding clause, wherein the magnetic clutch further includes a hermetic boundary separating the inner magnetized ring from the intermediate ring.

Example 13 includes the pump system of any preceding clause, wherein the hermetic boundary is made of a non-magnetic material.

Example 14 includes the pump system of any preceding clause, wherein the outer magnetized ring is coupled to the hermetic boundary via the tension spring.

Example 15 includes the pump system of any preceding clause, further including a clutch switch, the clutch switch to move the outer magnetized ring via the tension spring to engage and disengage the magnetic clutch by moving the inner magnetized ring and outer magnetized ring into and out of polar alignment.

Example 16 includes the pump system of any preceding clause, wherein the inner magnetized ring rotates with the impeller shaft and the intermediate ring rotates with the rotor shaft.

Example 17 includes the pump system of any preceding clause, wherein the outer magnetized remains stationary.

Example 18 includes the pump system of any preceding clause, wherein the intermediate ring includes a plurality of ferrous metal pieces, a number of ferrous metal pieces and a number of magnets on the inner magnetized ring based upon a desired gear ratio.

Example 19 includes the pump system of any preceding clause, wherein the desired gear ratio is determined by dividing the number of ferrous metal pieces on the intermediate ring by a number of magnetic pole pairs on the inner magnetized ring.

Example 20 includes the pump system of any preceding clause, wherein the number of ferrous metal pieces on the intermediate ring is equal to a sum of the number of magnetic pole pairs on the inner ring and a number of pole pairs on the outer ring.

Example 21 includes a method for controlling a magnetic clutch in a pump system, the method comprising determining whether the magnetic clutch is engaged, determining, when the magnetic clutch is not engaged, whether the magnetic clutch is ready for engagement based upon a phase of a fluid, and when the magnetic clutch is ready for engagement, providing a force to a tension spring to move an outer magnetized ring into polar alignment with an inner magnetized ring to engage the magnetic clutch by coupling an input shaft to an output shaft.

Example 22 includes the method of any preceding clause, further including releasing the force from the tension spring to move the outer magnetized ring out of polar alignment with the inner magnetized ring.

Example 23 includes the method of any preceding clause, further including detecting a failure within the pump system and determining an action to take based upon the detection of the failure.

Example 24 includes the method of any preceding clause, further including disengaging the magnetic clutch when a failure has been detected.

Example 25 includes the method of any preceding clause, further including prohibiting the engagement of the magnetic clutch when a failure has been detected.

Example 26 includes an aircraft comprising an engine and a pump system, the pump system comprising a rotor shaft coupled to a gearbox, the gearbox coupled to the engine, an impeller shaft, the impeller shaft coupled to an impeller, and a magnetic clutch to engage the rotor shaft and the impeller shaft, the magnetic clutch including a tension spring, an outer magnetized ring coupled to the tension spring, the outer magnetized ring including a first plurality of magnets, an inner magnetized ring coupled to the impeller shaft, the inner magnetized ring including a second plurality of magnets, the outer magnetized ring to magnetically engage with the inner magnetized ring, and an intermediate ring coupled to the rotor shaft, the intermediate ring disposed between the inner magnetized ring and the outer magnetized ring, the intermediate ring including a ferrous metal, wherein a first movement of the outer magnetized ring into a polar alignment with the inner magnetized ring engages the magnetic clutch and a second movement of the outer magnetized ring out of polar alignment with the inner magnetized ring disengages the magnetic clutch.

Example 27 includes the engine of any preceding clause, wherein the magnetic clutch further includes a hermetic boundary separating the inner magnetized ring from the intermediate ring.

Example 28 includes the engine of any preceding clause, wherein the hermetic boundary is made of a non-magnetic material.

Example 29 includes the engine of any preceding clause, wherein the outer magnetized ring is coupled to the hermetic boundary via the tension spring.

Example 30 includes the engine of any preceding clause, further including a clutch switch, the clutch switch to move the outer magnetized ring via the tension spring to engage and disengage the magnetic clutch by moving the inner magnetized ring and outer magnetized ring into and out of polar alignment.

Example 31 includes the engine of any preceding clause, wherein the inner magnetized ring rotates with the impeller shaft and the intermediate ring rotates with the rotor shaft.

Example 32 includes the engine of any preceding clause, wherein the outer magnetized ring remains stationary.

Example 33 includes the engine of any preceding clause, wherein the intermediate ring includes a plurality of ferrous metal pieces, a number of ferrous metal pieces and a number of magnets on the inner magnetized ring based upon a desired gear ratio.

Example 34 includes the engine of any preceding clause, wherein the desired gear ratio is determined by dividing the number of ferrous metal pieces on the intermediate ring by a number of magnetic pole pairs on the inner magnetized ring.

Example 35 includes the engine of any preceding clause, wherein the number of ferrous metal pieces on the intermediate ring is equal to a sum of the number of magnetic pole pairs on the inner magnetized ring and a number of pole pairs on the outer magnetized ring.

Example 36 includes an apparatus comprising means for modulating a flux between a magnetic outer ring and a magnetic inner ring, means for coupling the magnetic outer ring to the magnetic inner ring, and means for controlling the means for coupling.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A magnetic clutch apparatus comprising:
   a spring;
   an outer ring coupled to the spring, the outer ring including a first plurality of magnets;

an inner ring coupled to an output shaft, the inner ring including a second plurality of magnets, the outer ring to magnetically engage with the inner ring; and an intermediate ring coupled to an input shaft, the intermediate ring disposed between the inner ring and the outer ring, the intermediate ring including a ferrous metal, wherein, in a first position, the outer ring is in polar alignment with the inner ring and engages the magnetic clutch apparatus, and wherein, in a second position, the outer ring is out of polar alignment with the inner ring and disengages the magnetic clutch apparatus.

2. The magnetic clutch apparatus of claim 1, further including a hermetic boundary separating the inner ring from the intermediate ring.

3. The magnetic clutch apparatus of claim 2, wherein the hermetic boundary is made of a non-magnetic material.

4. The magnetic clutch apparatus of claim 2, wherein the outer ring is coupled to the hermetic boundary via the spring.

5. The magnetic clutch apparatus of claim 1, wherein the intermediate ring includes a number of ferrous metal pieces, the number of ferrous metal pieces of the intermediate ring based on a number of magnetic pole pairs on the inner ring and a predetermined gear ratio.

6. The magnetic clutch apparatus of claim 5, wherein the predetermined gear ratio is determined by dividing the number of ferrous metal pieces on the intermediate ring by the number of magnetic pole pairs on the inner ring.

7. The magnetic clutch apparatus of claim 6, wherein the number of ferrous metal pieces on the intermediate ring is equal to a sum of the number of magnetic pole pairs on the inner ring and a number of magnetic pole pairs on the outer ring.

8. The magnetic clutch apparatus of claim 1, further including a clutch switch, the clutch switch to move the outer ring via the spring to the first position from the second position and from the second position to the first position.

9. The magnetic clutch apparatus of claim 1, wherein the inner ring rotates with the output shaft and the intermediate ring rotates with the input shaft.

10. The magnetic clutch apparatus of claim 1, wherein the outer ring linearly translates from the first position to the second position based on an absence of a load on the spring.

11. A pump system comprising:
a rotor shaft coupled to a gearbox;
an impeller shaft, the impeller shaft coupled to an impeller; and
a magnetic clutch to engage the rotor shaft and the impeller shaft, the magnetic clutch including:
a spring;
an outer magnetized ring coupled to the spring, the outer magnetized ring including a first plurality of magnets;
an inner magnetized ring coupled to the impeller shaft, the inner magnetized ring including a second plurality of magnets, the outer magnetized ring to magnetically engage with the inner magnetized ring; and
an intermediate ring coupled to the rotor shaft, the intermediate ring disposed between the inner magnetized ring and the outer magnetized ring, the intermediate ring including a ferrous metal,
wherein a first movement of the outer magnetized ring into a polar alignment with the inner magnetized ring engages the magnetic clutch and a second movement of the outer magnetized ring out of polar alignment with the inner magnetized ring disengages the magnetic clutch.

12. The pump system of claim 11, wherein the magnetic clutch further includes a hermetic boundary separating the inner magnetized ring from the intermediate ring.

13. The pump system of claim 12, wherein the outer magnetized ring is coupled to the hermetic boundary via the spring.

14. The pump system of claim 11, further including a clutch switch, the clutch switch to move the outer magnetized ring via the spring to engage and disengage the magnetic clutch by moving the inner magnetized ring and the outer magnetized ring into and out of polar alignment.

15. The pump system of claim 11, wherein the inner magnetized ring rotates with the impeller shaft and the intermediate ring rotates with the rotor shaft.

16. The pump system of claim 11, wherein the intermediate ring includes a plurality of ferrous metal pieces, and wherein a number of ferrous metal pieces and a number of magnets on the inner magnetized ring are based upon a desired gear ratio.

17. The pump system of claim 16, wherein the desired gear ratio is determined by dividing the number of ferrous metal pieces on the intermediate ring by a number of magnetic pole pairs on the inner magnetized ring.

18. The pump system of claim 17, wherein the number of ferrous metal pieces on the intermediate ring is equal to a sum of the number of magnetic pole pairs on the inner magnetized ring and a number of magnetic pole pairs on the outer magnetized ring.

19. A method for controlling a magnetic clutch in a pump system, the method comprising:
determining whether the magnetic clutch is engaged;
determining, when the magnetic clutch is not engaged, whether the magnetic clutch is ready for engagement based upon a phase of a fluid; and
when the magnetic clutch is ready for engagement, providing a force to a spring to move an outer magnetized ring into polar alignment with an inner magnetized ring to engage the magnetic clutch by coupling an input shaft to an output shaft.

20. The method of claim 19, further including detecting a failure within the pump system and determining an action to take based upon the detection of the failure.

* * * * *